Sept. 13, 1960     D. F. GARMAN     2,952,430
MOTOR MOUNTING BRACKET
Filed Nov. 18, 1957
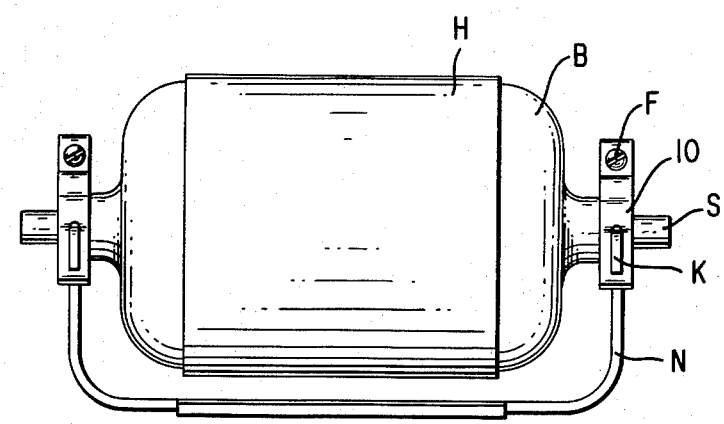
Fig. 1
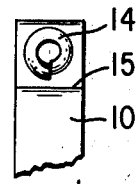
Fig. 5
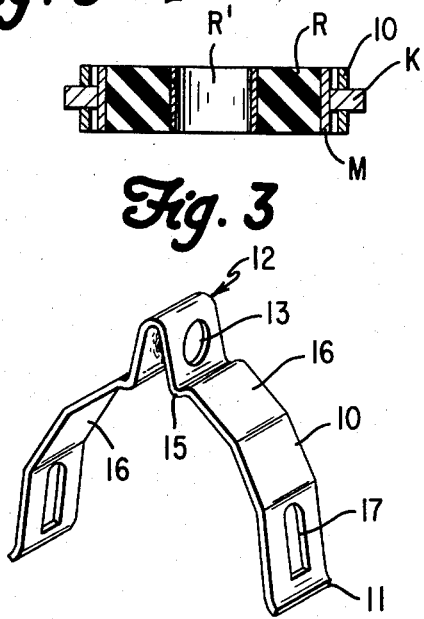
Fig. 3
Fig. 4
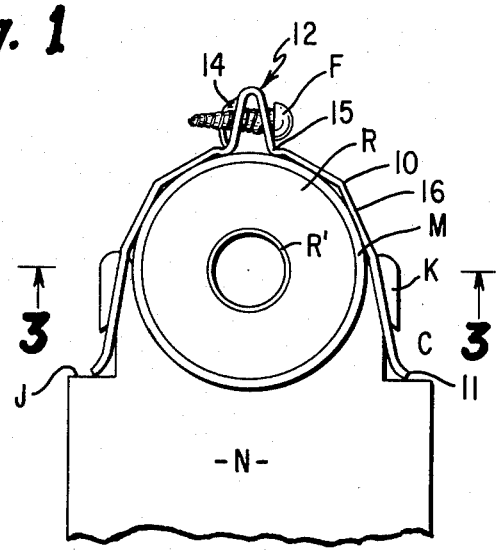
Fig. 2
INVENTOR.
DONALD F. GARMAN
BY
Malcolm W. Fraser
ATTORNEY

United States Patent Office 2,952,430
Patented Sept. 13, 1960

2,952,430

MOTOR MOUNTING BRACKET

Donald F. Garman, Toledo, Ohio, assignor to Prestole Corporation, Toledo, Ohio, a corporation of Michigan Filed Nov. 18, 1957, Ser. No. 697,208

1 Claim. (Cl. 248—26)

This invention relates to mounts for electric motors by which the motors are secured to brackets, fastened to a suitable base and an object is to produce a fastening device enabling the motor to be firmly anchored in place in a simple and convenient manner such that the usual metal rimmed armature shaft-receiving rubber annulus may be quickly and reliably anchored to the supporting bracket without difficulty.

Another object is to produce a motor mount fastener as above described having the novel features of construction, arrangement and operation hereinafter described.

For purposes of illustration but not of limitation, an embodiment of the invention is shown on the accompanying drawings in which Figure 1 is a side elevation of an electric motor and supporting bracket assembly;

Figure 2 is an enlarged fragmentary end elevation of the bracket showing the armature shaft-receiving rubber annulus clamped in position by a fastening device in accordance with this invention;

Figure 3 is a transverse sectional view substantially on the line 3—3 of Figure 2;

Figure 4 is a perspective view of the fastening device for securely anchoring the metal rimmed rubber annulus to the supporting bracket; and Figure 5 is a fragmentary view showing the integral nut on one arm of the fastening device.

The illustrated embodiment of the invention comprises an electric motor H having the usual bell housing B provided with reduced opposite end portions through which extend the ends of the armature shaft S. The projecting end portions of the armature shaft extend through a rubber annulus R having an internal bearing sleeve R' and a steel outer ring M suitably secured to the rubber annulus. The ring M seats in a cradle which is arcuately shaped to conform thereto, the cradle being indicated at C and being an integral part of a U-shaped sheet metallic mounting N, the horizontal part of the U being spaced from the motor and being secured in any suitable manner to a stationary base (not shown). The upper end portions of the mounting N adjacent the cradle rest C are provided with lateral shoulders J and above the shoulders J are downwardly facing hooks K, one being disposed at opposite sides of the rubber annulus as shown on Figure 2.

It will be understood that the rubber annulus abuts against the ends of the stationary bell housing B and it is necessary securely to anchor the rubber annulus in place and against rotation in the U-shaped support N. For this purpose a sheet metal fastener is provided consisting of a length of sheet metal in strap form and folded to provide a pair of similar arms 10, the outer or free edges 11 of which are slightly flanged outwardly. The central portion of the length of strap metal is folded upon itself to provide a substantially inverted V 12, substantially as indicated on Figure 4. In one arm of the V is a hole 13 and in the other is an integral nut 14 which in this instance is in the form of a well known "Prestole," such for example as shown and described in United States patent to B. C. Place, No. 2,081,065, dated May 18, 1937. It will be understood that other forms of integral nuts may be used to advantage. As shown a sheet metal screw F extends through the hole 13 and into engagement with the nut 14 and when drawn up securely holds the assembly in the desired position.

At the lower end of each leg of the inverted V 12 is a transverse rib 15 which extends downwardly to engage the outside of the metallic ring M for a purpose hereinafter to be described. It will be observed that extending from the ribs 15 outwardly to the free ends of the strap are panels 10, there being two panels of substantially equal size on opposite sides of the inverted V 12 and a final terminal panel somewhat longer than the adjacent panels. In the latter panel is an elongate slot 17 which is adapted to be slipped over the respective hook K.

It will be understood that after the rubber annulus assemblies have been disposed in their cradles C with the ends of the armature shaft S extending through and in contact with the bearing sleeves R', the retainers are applied. This is accomplished simply by slipping the slotted portions 17 over and into engagement with the hooked members K. Thereafter by applying the screw F and drawing the arms of the V 12 toward each other, the panels 16 are brought into intimate engagement with the respective portions of the outer ring M of the rubber annulus. At the same time the ribs 15 are forced tightly into engagement with the ring so that an intimate frictional contact between the retainer and the ring M is effected quickly and without difficulty.

By having the sides of the arms 10 paneled as above described, a greater effective contact between the retainer and the ring M is effected than in the case of an arcuate retainer which may not be of the correct curvature properly and adequately to engage the entire periphery of the ring M. By employing the paneled construction a much firmer contact is effected and this is aided by the transverse ribs 15 which tend to bite into the surface of the ring when the fastener F is drawn up tightly. The panels 10 effect a line contact with the periphery of the ring M which is supplemented by the biting action of the ribs 15.

Numerous changes in details of construction, arrangement and choice of materials may be effected without departing from the spirit of the invention, especially as defined in the appended claim.

What I claim is:

In a motor mounting bracket having an upstanding U-shaped bracket having a cradle in the upper end of each arm, a steel rimmed rubber annulus assembly in each cradle receiving the adjacent end of the motor armature shaft, there being downwardly facing hooks on the opposite sides of each cradle, the improvement which comprises a sheet metal clamp for securing the rubber annulus assembly to the supporting bracket, said clamp comprising a sheet metal strap having elongate slots in the end portions to engage the hooks on the bracket, an inverted V-shaped portion centrally of said strap provided with a hole on one side and a nut integral with and pressed from the opposite side so that a screw inserted through the hole and into the nut enables the strap to be drawn up tightly against the steel rim of the rubber annulus assembly, the sides of the strap between said inverted V and the elongate slots being in the form of flat panels, at least two of said panels being formed on either side of said inverted V, adjacent ones of said panels on each side of said V adjoined to one another forming an obtuse angular relationship therebetween, and transverse downwardly extending ribs formed on either side of and adjacent to said inverted V, said ribs being formed in the nature of a reverse bend of the material of said strap, each of said flat panels adapted to provide a line contact between said strap and the rubber annulus rim and said downwardly extending transverse ribs adapted to bite into the rubber annulus rim when said screw is drawn up tightly.

References Cited in the file of this patent

UNITED STATES PATENTS

| 559,951 | Rhind | May 12, 1896 |
| 828,164 | Williams | Aug. 7, 1906 |
| 2,729,846 | Reed | Jan. 10, 1956 |